DIODE RECEPTACLE

Original Filed Feb. 1, 1961

INVENTORS.
STANLEY THOMAS DEAKIN
ALBERT E. POWELL
BY John P. Chandler
THEIR ATTORNEY.

United States Patent Office 3,145,329
Patented Aug. 18, 1964

3,145,329
DIODE RECEPTACLE

Stanley Thomas Deakin, Walton-on-Thames, England, and Albert E. Powell, Old Greenwich, Conn., assignors to Sealectro Corporation, Mamaroneck, N.Y., a corporation of New York Continuation of application Ser. No. 86,495, Feb. 1, 1961. This application Apr. 12, 1963, Ser. No. 273,801
Claims priority, application, Great Britain, Feb. 2, 1960, 3,689/60
6 Claims. (Cl. 317—234)

This invention relates to a diode receptacle for holding a semiconductor rectifier. It has particular reference to a convenient holder which protects the rectifier and at the same time permits an operator to plug the rectifier into an operating circuit or to transfer the rectifier to a test circuit where its characteristics may be determined.

Small rectifier diodes are used in many kinds of electronic circuits and computers. They are often assembled in matrices where a large number are interconnected as switching units. The usual method of connecting these units to their circuit is by soldering, and the use of heat when making a soldered connection often causes the failure of the device. In order to test such units, the soldered connections must be melted for removal to a test circuit and this operation again introduces the possibility of overheating. The receptacle hereinafter described eliminates these difficulties and permits the insertion of a diode rectifier into any form of circuit without soldering to that circuit. In the event of a suspected failure, the receptacle can be removed from the operating circuit and inserted into a test circuit for determination of its electrical characteristics.

One of the objects of this invention is to provide an improved receptacle for circuit components which avoids one or more of the disadvantages and limitations of prior art arrangements.

Another object of the invention is to eliminate repeated soldering and resoldering of component leads when removing the component from the circuit for test purposes.

Another object of the invention is to facilitate the removal and insertion of diode components in an operating circuit.

Another object of the invention is to permit the testing of circuit components after the component leads have been soldered to conductive terminals.

Another object of the invention is to provide a shielded assembly which protects a diode component from physical injury and from stray fields.

The invention includes a diode receptacle comprising an elongated cylindrical double conductor which can be inserted into a conductive holder for connection to an external circuit. The double conductor includes insulation for securing the conductors in axial alignment with each other. A cylindrical container is secured to the double conductor and contains a cavity which incloses the diode component. The diode component leads are connected to the double conductors by soldering.

For a better understanding of the present invention, together with other and further objects thereof, reference is made to the following description taken in connection with the accompanying drawings.

Figure 1:
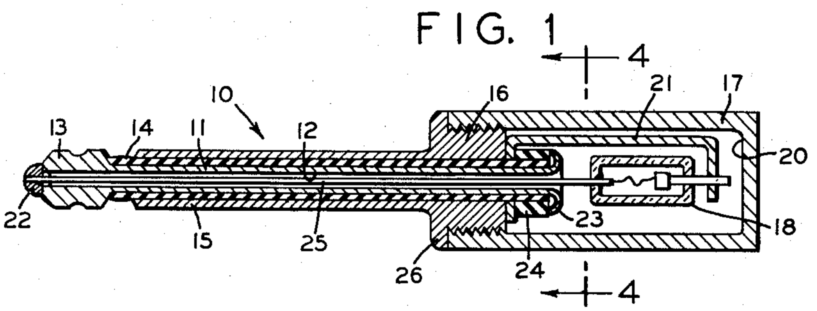
FIG. 1 is a cross sectional view taken along the axis of the receptacle and shows the cavity for supporting the diode component.

Referring now to FIG. 1, the preferred form of the diode receptacle includes an elongated cylindrical double conductor 10 which includes a central core 11 made of conductive material and containing an axial hole 12 and an enlarged end portion 13. Surrounding the central core 11 is an insulation sleeve 14 (e.g., of vitreous or stove hardening enamel coated on the core 11) and on the outside of sleeve 14 is a conductive shell 15. The end portion 13 and the sleeve 15 form the two conductors which make contact with cooperative contact members in a holder to connect the diode to an external circuit.

The outer shell 15 is secured at one end to a threaded block 16 whose male thread engages a female thread on a hollow cylindrical member 17 which encloses a diode rectifier unit 18. Within the cavity 20 a bracket 21 is secured which rests on block 16 and makes contact therewith. The other end of the bracket contains a means for soldering to one conductive lead of the diode 18. The other conductive lead of the diode extends through the hole 12 for the entire length of the double conductor 10 and is soldered to the enlarged end portion 13 of the central conductor 11 by means of a small drop of solder 22.

The bracket 21 is secured to the block 16 by means of a turned-over portion 23 of the central conductor 11, this turned-over portion formed by a swaging action which clamps the turned-over portion 23 to an insulating washer 24. It will be evident from this description that terminal 13 makes connection to a central diode lead 25 and one end of the diode 18. The other diode terminal is secured to bracket 21 and block 16 which in turn is connected to shell 15. The hollow container 17 may be removed by unscrewing from block 16 and thereby providing access to the component 18 for removal or exchange. When cylinder 17 is screwed onto the assembly it limits against a shoulder 26 which insures a seal against atmospheric contamination. The cylinder 17 may be made of either metal or plastic.

Figure 2:
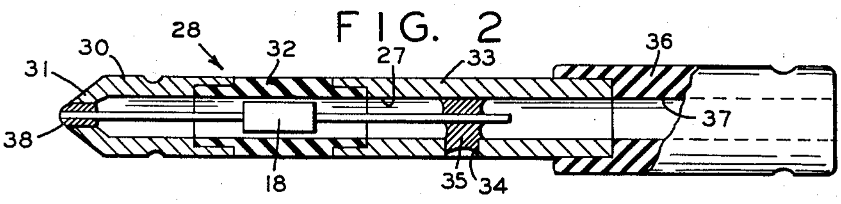
FIG. 2 is a cross sectional view of an alternate form of the receptacle.

The receptacle shown in FIG. 2 is an alternate construction wherein the diode component 18 is positioned within a central cavity 27 of the double conductor 28. The double conductor includes a first hollow cylindrical member 30 which forms the end portion of the receptacle and includes a cone end 31 for easy insertion into spring clips. The end portion 30 is secured to an intermediate portion 32 made of insulating material. This intermediate portion has the same outside diameter as end portion 30 and also has the same diameter of cavity 27 as the other two conductors. The second conductor 33 is secured to intermediate portion 32 as its other end and is for connection to a second set of spring contacts when inserted into a holder. Conductor 33 is formed with a side hole 34 where solder 35 may be inserted to make contact with one of the terminal conductors of diode 18. The double conductor 28 is secured to a handle 36 which is made of insulating material and which contains a cavity 37 of the same diameter as cavity 27.

When the diode 18 is to be assembled in the holder shown in FIG. 2 it is dropped through cavities 37 and 27 so that one of its terminal conductors emerges through a hole in the end of conductor 30. This terminal conductor may be soldered to conductor 30 by touching a soldering iron with solder to the terminal conductor and thereby providing a soldered joint 38. The other terminal conductor of diode 18 may be soldered to conductor 33 by melting solder into hole 34 and thereby forming soldered connection 35.

Figure 3:
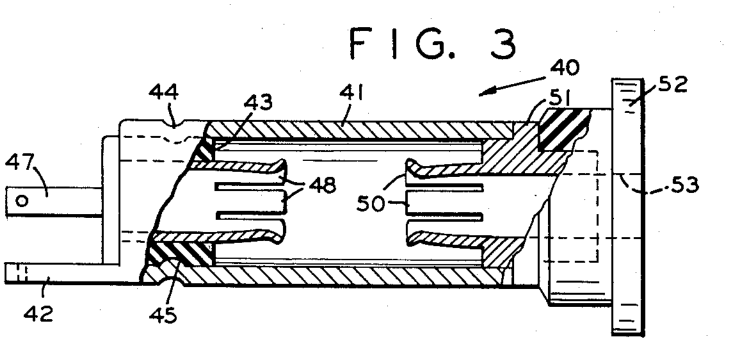
FIG. 3 is a side view, with some parts in section, of a holder into which the receptacle may be inserted.

After assembly, either one of the diode receptacles, as shown in FIG. 1 or 2, may be connected to a circuit by inserting them into a holder 40 shown in partial cross section in FIG. 3. The holder comprises a hollow cylindrical metal shell 41 containing an extension 42 for connection to an external circuit. At one end of shell 41 an insulator 43 is secured by means of spinning a portion 44 of the shell material into a groove 45 formed in the insulation material. The insulator 43 is formed around a metallic spring member 46 which includes a terminal end portion 47 for connection to an external circuit and a number of spring fingers 48 which are suitably formed for receiving terminal 13 of the elongated double conductor.

At the other end of the conductive shell 41 a similar spring arrangement is mounted. This arrangement includes spring ends 50 similar to the springs 48. The arrangement includes a shoulder 51 which is secured to the end of shell 41 by soldering or welding and on the other side of the shoulder a block of insulation 52 is secured. The block of insulation 52 is formed with a central hole 53 through which the double conductor 10 may be inserted into the holder. When the receptacle is properly placed in the holder, springs 48 make contact with end portion 13 (see FIG. 1) and the shell 15 makes contact with springs 50. A similar arrangement, but with larger size springs may be used for holding the receptacle shown in FIG. 2.

Figure 5:
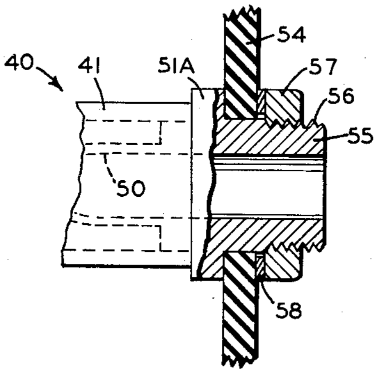
FIG. 5 is a side view, with some parts in section, of an alternate form of holder, suitable for mounting on a panel.
Figure 4:
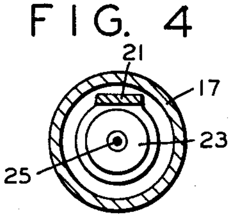
FIG. 4 is a cross sectional view of the receptacle shown in FIG. 1 and is taken along line 4—4 of that figure.

If a number of holders are to be mounted upon a single panel as is generally the case in matrices, the spring arrangement 51 is formed with a larger shoulder 51A (see FIG. 5) which limits against one side of an insulating panel 54. The end portion of spring holder 51 is formed with an extension 55 having a screw thread 56. The holder 40 is secured to panel 54 by means of a nut 57 and a resilient washer 58.

It will be evident from the above description that a diode receptacle can be inserted into and withdrawn from a suitable holder without a soldering operation or the application of heat. The receptacle encloses the diode and protects it from physical injury.

The foregoing disclosure and drawings are merely illustrative of the principles of the invention and are not to be interpreted in a limiting sense. The only limitations are to be determined from the scope of the appended claims.

In particular it is to be understood that other components than diodes may be inserted in the cavity. These include condensers, resistors, potentiometers, lamp bulbs, or other electrical components which may be used alone or in combination with a diode.

This application is a continuation of our application Serial No. 86,495, filed February 1, 1961.

What we claim is:

1. A diode receptacle plug comprising:

(1) an elongated cylindrical double conductor adapted to be inserted longitudinally into a plug holder having a pair of axially spaced contact elements therein for connection to an external circuit, said double conductor including a first conductive hollow member having a portion forming the forward end of said double conductor for providing a first contact adapted to make contact with one of said contact elements of said plug holder, (2) a second conductive hollow member axially aligned with said first member and having its forward end displaced from said first contact for providing a second contact disposed along the length of said elongated double conductor adapted to make contact with the other of said contact elements of said plug holder, (3) and an insulator between said hollow members for insulating between said contacts, (4) a handle mounted at the rear of said double conductor to be held for inserting said double conductor into said plug holder, (5) said members and handle constituting a unitary receptacle plug body, (6) a diode rectifier within said plug body having a cathode lead and an anode lead, (7) one of said leads extending within said first hollow member and being connected thereto, (8) and the other of said leads being connected to said second hollow member for providing a predetermined conductive relationship between said diode rectifier and said first and second contacts for facilitating the removal and insertion of said diode rectifier component in an operating circuit, a test circuit, and the like.

2. A diode receptacle plug comprising:

(1) an elongated cylindrical double conductor adapted to be inserted longitudinally into a plug holder having a pair of axially spaced contact elements therein for connection to an external circuit, said double conductor including a first conductive hollow member having a portion forming the forward end of said double conductor for providing a first contact adapted to make contact with one of said contact elements of said plug holder, (2) a second conductive hollow member axially aligned with said first member and having its forward end displaced from said first contact for providing a second contact disposed along the length of said elongated double conductor adapted to make contact with the other of said contact elements of said plug holder, (3) and an insulator between said hollow members for insulating between said contacts, (4) said hollow members and insulator having substantially the same outside diameter and forming a plug-type double conductor with axially spaced first and second contacts to cooperate with said pair of contacts in said holder, (5) a handle mounted at the rear of said double conductor to be held for inserting said double conductor into said plug holder, (6) said members and handle constituting a unitary receptacle plug body, (7) a diode rectifier within said plug body having a cathode lead and an anode lead, (8) one of said leads extending within said first hollow member and being connected thereto, (9) and the other of said leads being connected to said second hollow member for providing a predetermined conductive relationship between said diode rectifier and said first and second disposed contacts for facilitating the removal and insertion of said diode rectifier component in an operating circuit, a test circuit, and the like.

3. A diode receptacle plug comprising:

(1) an elongated cylindrical double conductor adapted to be inserted longitudinally into a plug holder having a pair of axially spaced contact elements therein for connection to an external circuit, said double conductor including a first conductive hollow member having an axial hole extending from its forward end and through the entire length of the member, said member having a portion forming the forward end of said double conductor for providing a first contact adapted to make contact with one of said contact elements of said plug holder, (2) a second conductive hollow member axially aligned with said first member and having its forward end displaced from said first contact for providing a second contact disposed along the length of said elongated double conductor adapted to make contact with the other of said contact elements of said plug holder, (3) and an insulator sleeve between said hollow members for insulating between said contacts, (4) an enlarged block at the rear end of said second hollow member, (5) a cylindrical member detachably mounted on said block forming a handle for inserting said double conductor into said plug holder, (6) said members and handle constituting a unitary receptacle plug body, (7) a diode rectifier within said plug body having a cathode lead and an anode lead, (8) one of said leads extending within said axial hole of said first hollow member and being connected thereto at said forward end, (9) and the other of said leads being connected to said second hollow member for providing a predetermined conductive relationship between said diode rectifier and said first and second contacts for facilitating the removal and insertion of said diode rectifier component in an operating circuit, a test circuit, and the like.

4. The structure as set forth in claim 3 wherein said enlarged block is formed with male screw threads on its outer surface and said cylindrical member is formed at its forward end with matching female screw threads for engagement therewith.

5. A diode receptacle plug as in claim 3 having a bracket with one end connected to said block and the other end connected to said other diode lead.

6. A diode receptacle plug comprising:

(1) an elongated cylindrical double conductor adapted to be inserted longitudinally into a plug holder having a pair of axially spaced contact elements therein for connection to an external circuit, said double conductor including a first conductive hollow member having a portion forming the forward end of said double conductor for providing a first contact adapted to make contact with one of said contact elements of said plug holder, (2) a second conductive hollow member axially aligned with said first member and having its forward end displaced from said first contact for providing a second contact disposed along the length of said elongated double conductor adapted to make contact with the other of said contact elements of said plug holder, (3) and an insulator between said hollow members for insulating between said contacts, (4) a handle mounted at the rear of said double conductor to be held for inserting said double conductor into said plug holder, (5) said members and handle constituting a unitary receptacle plug body, (6) a diode rectifier within said elongated cylindrical double conductor and having a cathode lead and an anode lead, (7) one of said leads extending within said first hollow member and being connected thereto, (8) and the other of said leads being connected to said hollow member for providing a predetermined conductive relationship between said diode rectifier and said first and second disposed contacts for facilitating the removal and insertion of said diode rectifier component in an operating circuit, a test circuit, and the like.

References Cited in the file of this patent

UNITED STATES PATENTS

| | | |
|---|---|---|
| 1,639,858 | Potter | Aug. 23, 1927 |
| 1,970,149 | Pugh | Aug. 14, 1934 |
| 2,610,223 | Puerner | Sept. 9, 1952 |
| 2,751,527 | Shower | June 19, 1956 |
| 3,025,435 | Green | Mar. 13, 1962 |